(12) United States Patent
Chess et al.

(10) Patent No.: US 7,412,503 B2
(45) Date of Patent: Aug. 12, 2008

(54) METHOD AND APPARATUS FOR THE DYNAMIC INTRODUCTION OF NEW ATTRIBUTES INTO POLICIES

(75) Inventors: David M Chess, Mohegan Lake, NY (US); Murthy V Devarakonda, Peekskill, NY (US); Alla Segal, Mount Kisco, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 10/719,575

(22) Filed: Nov. 21, 2003

(65) Prior Publication Data

US 2005/0114532 A1 May 26, 2005

(51) Int. Cl.
*G06F 15/173* (2006.01)
*G06F 15/16* (2006.01)
(52) U.S. Cl. .................. 709/223; 709/224; 709/226; 709/230
(58) Field of Classification Search .......... 709/223, 709/224, 226, 230
See application file for complete search history.

(56) References Cited

U.S. PATENT DOCUMENTS

| 7,272,625 | B1 * | 9/2007 | Hannel et al. ............... 709/200 |
| 2001/0019539 | A1 * | 9/2001 | Kawakami .................. 370/256 |
| 2001/0053694 | A1 * | 12/2001 | Igarashi et al. .............. 455/433 |
| 2002/0147726 | A1 * | 10/2002 | Yehia et al. ................. 707/101 |
| 2003/0225801 | A1 * | 12/2003 | Devarakonda et al. ...... 707/205 |
| 2004/0218535 | A1 * | 11/2004 | Liong et al. ................. 370/238 |

OTHER PUBLICATIONS

"Toolkit-Based Approach to Policy-Managed Storage", Devarakonda, Murthy et al., Proc. of 4th IEEE Intl. Workshop on Policies for Distributed Systems and Networks, Jun. 2003, 4 pages.
"Policy-Based Autonomic Storage Allocation", Devarakonda, Murthy, et al., Proc. Of 14th IFIP/IEEE Intl. Workshop on Distributed Systems: Operations and Management, DSOM 2003, Marcus Brunner and Alexander Keller (Eds.) Published by Springer-Verlag as Lecture Notes on Computer Science 2867, 12 pages.
"A Policy-Based Storage Management Framework", Devarakonda, Murthy, et al., Proceedings of Policy 2002 Intl. Workshop on Policies for Distributed Systems and Networks, Monterey, CA, Jun. 2002, pp. 1-4.
"Policy-Enabled Networking Architecture", Verma, Dinesh C., New Riders Publishing, 2001, 22 pages.

(Continued)

*Primary Examiner*—Kenny S Lin
(74) *Attorney, Agent, or Firm*—Harrington & Smith, PC

(57) ABSTRACT

In one aspect this invention provides a computer program embodied on a computer readable medium that is executed by at least one data processor of a policy management system. The computer program includes first computer program instructions for implementing a user interface and second computer program instructions for implementing a policy manager that is coupled to the user interface via a policy repository for introducing a new attribute, using the first computer program instructions, into a policy for a policy-managed system, without requiring a change to (e.g., without having to re-write or re-compile) the second computer program instructions.

1 Claim, 3 Drawing Sheets

OTHER PUBLICATIONS

Ludwig et al., "Web Service Level Agreement (WSLA) Language Specification", 2001, 110 pgs.

Lymberopoulos et al., "An Adaptive Policy Based Management Framework for Differentiated Services Networks", Jun. 2002, Proc. 3rd IEEE Workshop on Policies for Distributed Systems and Networks (Policy 2002), Monterey, CA, pp. 147-158.

Ludwig et al., "A Service Level Agreement Language for Dynamic Electronic Services", Journal of Electronic Commerce Research, vol. 3, No. 1/2, Sep. 2002, 23 pages.

* cited by examiner

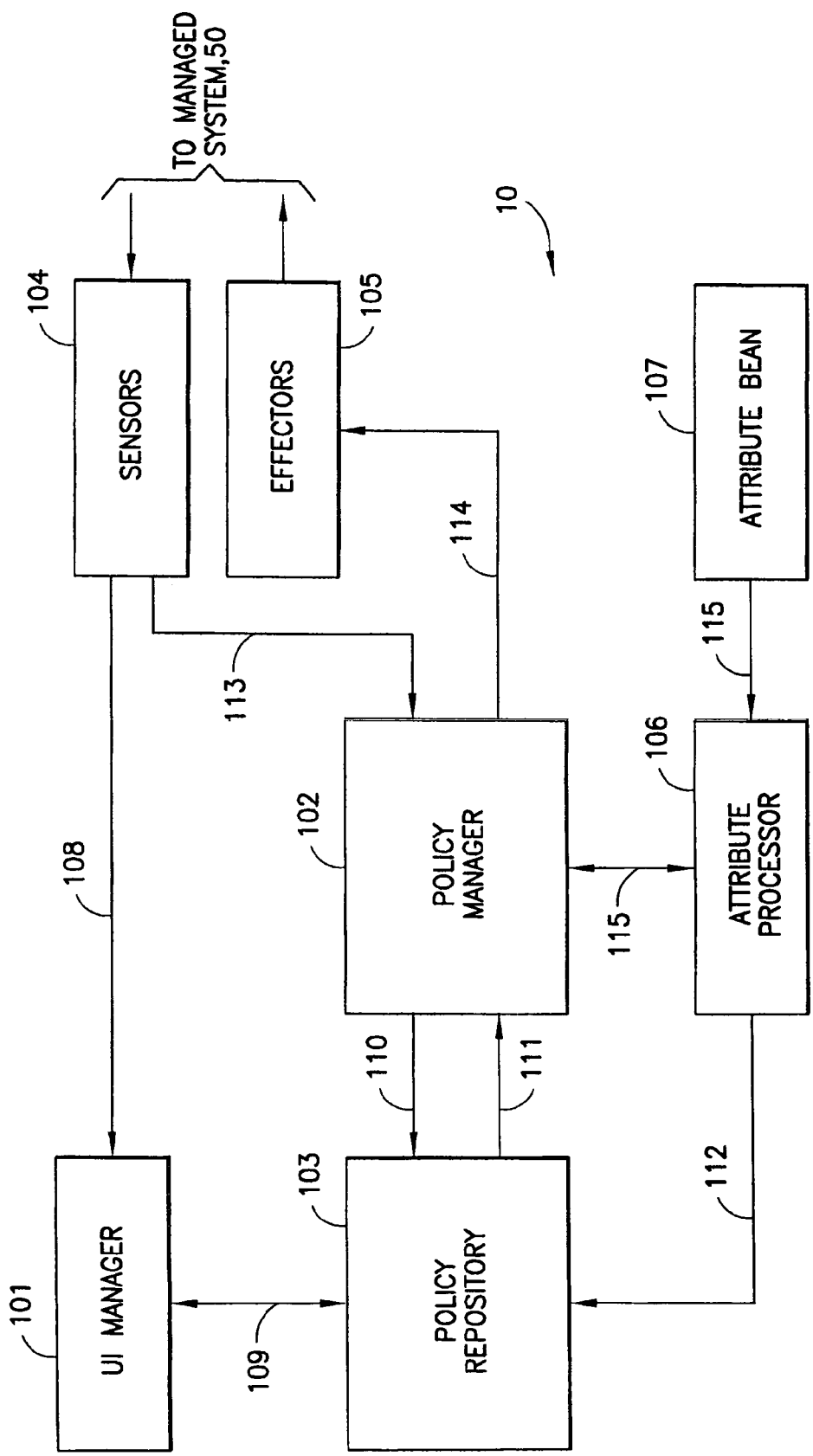

METHOD AND APPARATUS FOR THE DYNAMIC INTRODUCTION OF NEW ATTRIBUTES INTO POLICIES

TECHNICAL FIELD

These teachings relate generally to policy-based management systems and methods, and relate further to the field of computer system management and autonomic computing.

BACKGROUND

There have been significant developments in the area of policy-based computing. The development of policy-based computing is expected to simplify and reduce the cost of system administration, while increasing the quality of service. Policy-based computing allows an administrator to specify a set of rules to guide the operations of a computer system. The techniques of policy-based computing are especially applicable to the area of autonomic computing.

Some examples of policies include a policy that would re-allocate storage and notify the user when specific performance requirements are not met; and a policy that specifies a specific type of service be assigned to a user with specific attributes, e.g. a user associated with a specific company or a specific IP address.

Currently existing efforts in this area include "Policy-Based Networking: Architecture and Algorithms" (New Riders publishing, 2001) by Dinesh C. Verma, which discusses the application of policy-based computing to networking; and "A Framework for Policy-Based Storage Management" by Murthy Devarakonda, Jack Gelb, Avi Saha, and Jimmy Strickland (Proceedings of Policy 2002 Intl. Workshop on Policies for Distributed Systems and Networks, Monterrey, Calif., June 2002), which discusses policy-based storage management. Also, the document available from the Distributed Management Task Force (DMTF), entitled "IETF/DMTF policy framework", http://www.dmtf.org/download/presentations/junedev01/track/0613-01_policy.pdf, represents an attempt to develop standards in policy-based computing.

In currently-existing approaches that are known to the inventors the policy attributes are static, which makes it necessary to change the policy-processing code whenever there is a change in the policy requirements. For example, a designer of a storage system may decide that most users would prefer to measure the quality of service in terms of throughput and response time. Such a system can allow the user to define a quality of service policy that requests a storage re-allocation whenever the throughput falls below some desirable number. The storage system may have much more information available, but the user is not able to use all of the available metrics in the policies. Yet, it may be the case that in some enterprise it is desirable to define a policy that would trigger storage re-allocation whenever the transfer rate and some combination of other values, e.g., average of the transfer rate and the throughput, do not meet some criteria. While all of these various metrics may be available via low-level system commands, they are not currently available to be used in policies, either because the system (policy) designer did not initially consider them to be important, or because the policy system was migrated to a different storage system that has different characteristics.

The ability to dynamically introduce the new attributes could be especially important in the area of electronic business (e-business) on demand, or in autonomic computing where it would be desirable to employ standard policies for different system configurations. For example, a database system may use the storage provided by any one of several different data storage systems that each provide different metrics.

Another example of a policy where the dynamic introduction of attributes is desirable is the assignment of a specific class of service or priority, or one that allocates resources based on specific requester characteristics. For example, a system may allow the specification of policies that assign a highest priority to requests that originate from a company A. At some future time it may become necessary to add additional parameters to such requests: for example, to vary the priority between different applications of company A as identified by requests from a programmer with a specific ID, or from different servers. Some of these "requester attributes", such as ID and/or originating server, may not be known at the time the system is created. In this case it would clearly be advantageous to allow the addition of these attributes during system operations.

However, prior to this invention a capability to dynamically introduce attributes for a policy was not available.

SUMMARY OF THE PREFERRED EMBODIMENTS

The foregoing and other problems are overcome, and other advantages are realized, in accordance with the presently preferred embodiments of these teachings.

In one aspect this invention provides a method to dynamically introduce a new attribute into a policy for a policy-managed system, without requiring a change to a policy manager. The method includes operating at least one sensor coupled to the policy-managed system to dynamically discover a value of at least one existing metric; associating a new attribute with the discovered value of the at least one existing metric; incorporating the new attribute into a policy; and storing the policy for future use. The method further determines if the new attribute is directly measurable or discoverable by the at least one sensor, or more generally if the value of the new attribute can be determined by the at least one sensor, and if it is not measurable or discoverable, or cannot be so determined, the method determines if a definition of the attribute currently exists. If the definition exits, the method determines from the attribute definition the identity of at least one metric having a value needed to determine the attribute value. The method further obtains the value of the at least one needed metric from a corresponding one of the sensors, and determines the value of the attribute from the obtained at least one metric value.

In another aspect this invention provides a policy management system that includes a user interface and a policy manager that is coupled to the user interface via a policy repository for introducing a new attribute, using the user interface, into a policy for a policy-managed system, and without requiring a change to the policy manager.

In a still further aspect thereof this invention provides a computer program embodied on a computer readable medium that is executed by at least one data processor of a policy management system. The computer program includes first computer program instructions for implementing a user interface and second computer program instructions for implementing a policy manager that is coupled to the user interface via a policy repository for introducing a new attribute, using the first computer program instructions, into a policy for a policy-managed system, without requiring a change to (e.g., without having to re-write or re-compile) the second computer program instructions.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 is a simplified block diagram of a system that is suitable for practicing this invention, and that includes a user interface, a policy manager, a policy repository, sensors and effectors and an attribute processor.

FIG. 3A illustrates policy definition and FIG. 3B illustrates policy execution.

DETAILED DESCRIPTION OF THE PREFERRED EMBODIMENTS

Figure 2B:
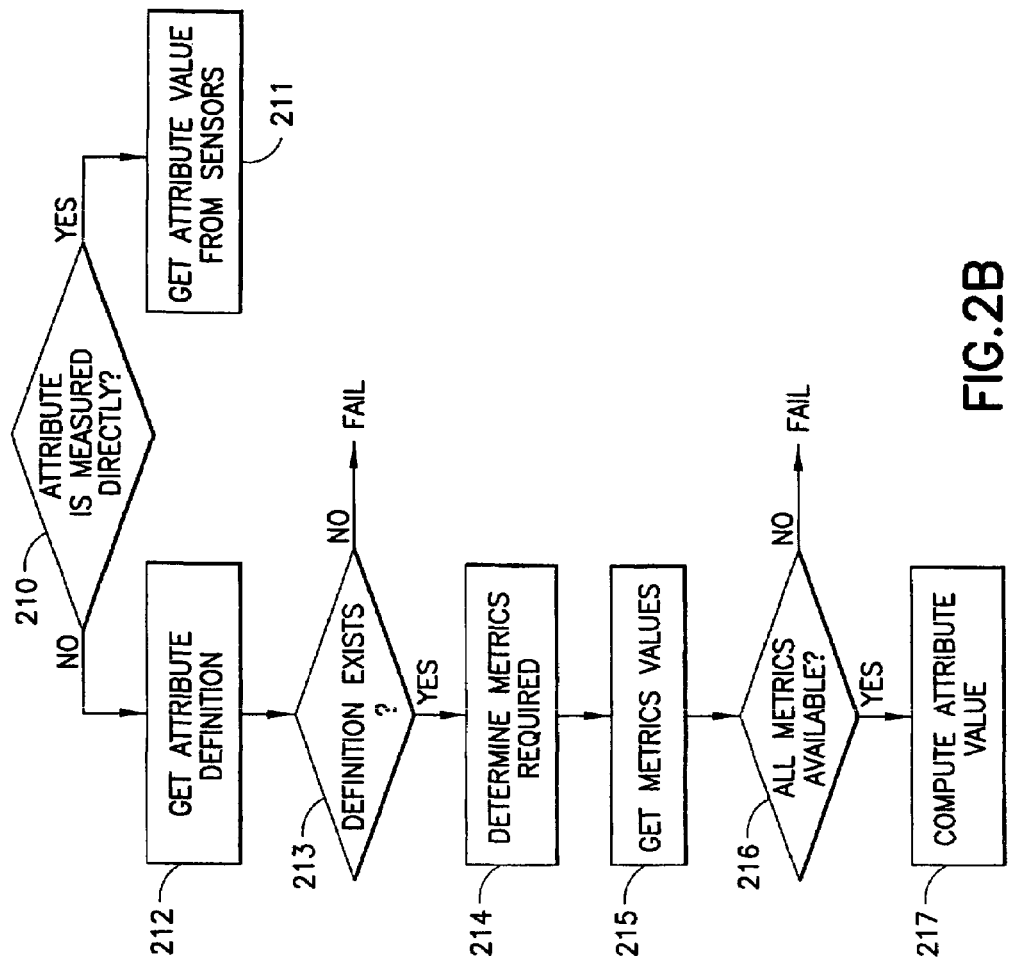
FIG. 2B is a logic flow diagram that illustrates a process of determining the value of discoverable attributes during policy evaluation.

By way of introduction, this invention provides for the dynamic discovery, synthesis and introduction of new management attributes into a policy-based management system. As but one example, a policy-based storage allocation manager may be initially configured to use a combination of maximum throughput, response time, and size of data as attributes for storage allocation. This invention provides a policy-based manager wherein a new attribute, for example a demand attribute or a quality of service (QoS) attribute, can be introduced into the management system without rewriting, recompiling, or even stopping the operation of the policy-based management system.

The method and the system disclosed by this invention provide techniques to discover the value of an attribute or to synthesize a new attribute having a value obtained from a combination of sensor outputs, and is based on self-description of low level resources, object technology, and a policy manager and its interfaces to a resource manager. An attribute is discoverable if the underlying physical resources have a capability that can be described using the attribute. An attribute can be synthesized from already known attributes by introducing an object into the system (e.g., a Java™ object) that contains methods to construct the characteristics of the new attribute from already known attributes. An attribute can also be introduced via a user interface. A new attribute is further incorporated into the policy-based management system through a series of systematic steps which allow its use in policies at specification time, and by proper de-referencing at policy execution time.

Java™ and JavaBean™ are trademarks of Sun Microsystems, Inc. A JavaBean™ is by definition a reusable software component that can be visually manipulated in builder tools.

FIG. 1 shows a computer system, specifically a policy management system 10 that is constructed and operated in accordance with a presently preferred embodiment of this invention. The policy management system 10 includes a user interface manager 101 that is assumed to incorporate a user interface (UI) component having a user input device(s), such as a keyboard, a pointing device, and/or a voice recognizer, as well as a user output device(s), such as a display screen and/or a voice synthesizer. The policy management system 10 further includes a policy engine or manager 102, a policy repository 103, sensors 104 and effectors 105 coupled to a policy-managed system 50 and an attribute processor 106. One or more attribute beans 107 may be present, each representing, in an embodiment of this invention, a vehicle for introducing a new attribute. The attribute beans 107 can be implemented as, for example, JavaBean™ objects that express methods to construct the characteristics of a new attribute from already known attributes.

One exemplary and non-limiting example of an attribute bean 107 is a Java class, for example, aveTransferRateAttributeBean, that defines a new "average transfer rate" attribute. The attribute is computed as an average of two metrics: read-transfer-rate and write-transfer-rate. The attribute bean 107 includes methods to: (a) get/set the name of the attribute to facilitate introduction of this attribute (which could be simply done by the name of the bean itself), (b) get the names of the metrics that are required to determine the value of this attribute, in this case they are read-transfer-rate and write-transfer-rate, and (c) get the value of the attribute using the values of the metrics.

The attribute bean 107 implements a generic AttributeBeanInterface that defines these methods so that the policy manager 102 can use it for any attribute bean 107.

What follows is one non-limiting example of the aveTransferRateAttributeBean. Other embodiments, such as for example, one that sets the value(s) of the metric(s) and gets the value of the attribute in separate methods are also possible.

```
public class aveTransferRateAttributeBean implements AttributeBeanInterface {
    String attributeName;
    String[ ] metricNames = {"read-transfer-rate", "write-transfer-rate"};
    public String getAttributeName( ) { return attributeName; }
    public void setAttributeName(String attributeName) {
        this.attributeName = attributeName;
    }
    public String[ ] getMetricNames( ) {
        return metricNames;
    }
    public Object getAttributeValue(HashMap metricValues) {
        double readTransferRate = ((Double) metricValues.get
            ("read-transfer-rate")).getValue( );
        double writeTransferRate = ((Double) metricValues.get
            ("write-transfer-rate")).getValue( );
        return new Double ((readTransferRate+writeTransferRate)/2);
    }
}
where AttributeBeanInterface is a generic interface
```

```
public interface AttributeBeanInterface {
    public String getAttributeName( );      // get name of the attribute to facilitate discovery
    public void setAttributeName(String name);
    public String[ ] getMetricNames( );     // names of the metrics required to compute or
                                            determine the value of the bean
                                            // note that String[ ] could be Enumeration or Vector
                                            or Iterator
                                            // or any other way to return the list of names in a
                                            programming language
    public Object getAttributeValue(HashMap metricValues); // in an alternative embodiment,
                                            the metric values can be set via one or more
                                            setMetricValue(s) method(s)
}
```

The policy-managed system 50 could be, as non-limiting examples, one of a data storage system, a database system, a random machine such as a web server, and a CPU.

In general, the sensors 104 can be classified as dynamic sensors or as static sensors. For the example of a data storage system as the policy-managed system 50 the dynamic sensor(s) can return real-time or substantially real-time information that is descriptive of, as examples, response time, throughput, capacity and demand. Static sensors provide other types of information, such as the size of the storage system, system model number, historical error logs, and so forth. The effectors 105 in this example may be any type of mechanism that can be used to perform some type of physical allocation. For example, in a RAID-type data storage system the effector(s) 105 may be used to change the striping of the RAID-array.

Policies are provided to the system 10 via the user interface 101 and are stored in the policy repository 103, via bus 109. Policies are read out from the policy repository 103 over bus 111 for processing by the policy manager 102, and can be returned via bus 110. The metrics that can be used in the policies are measured and provided, via buses 108 and 113, by the sensors 104 based on properties of the policy-managed system 50. As was noted above, the policy-managed system 50 could be, as a non-limiting example, a data storage system. Once the policy or policies have been evaluated, the results of policy evaluation are carried out on the policy-managed system 50 by the effectors 105, via bus 114 from the policy manager 102.

In the preferred embodiment of this invention, attribute information is stored as part of a policy in the policy repository 103, but an alternative embodiment the attribute information can be stored in a separate repository (not shown), or it can be stored as part of the policy manager 102. New attributes can be defined either via the user interface 101 or the attribute beans 107, the properties of which can be discovered and incorporated into the policies by the attribute processor 106, via bus 115, that can be either a separate component shown on the diagram or a sub-component of the policy manager 102. Defined attributes are incorporated into the policies by the user interface 101 or the attribute processor 106. The resulting policies are then stored in the policy repository 103, via buses 109 (from the UI 101) and 112 (from the attribute processor 106). During policy execution, the policy manager 102 may use (via bus 115) the attribute processor 106 to determine runtime values of an attribute by using the metric values provided by the sensors 104 and the method(s) of an attribute bean 107. In an alternative embodiment, this processing may be done solely within the policy manager 102.

Figure 2A:
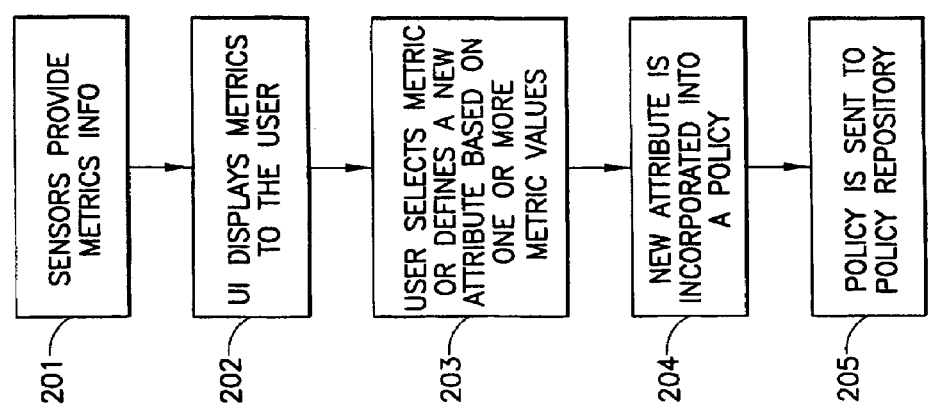
FIG. 2A is a logic flow diagram that illustrates a process of the introduction of new discoverable attributes via the user interface of FIG. 1.

FIG. 2A shows a method for the introduction of new discoverable attributes via the UI 101. In Block 201 one or more of the sensors 104 provide information about all available metrics via bus 108. This can be accomplished in various ways, depending on the design of the specific sensors 104. For example, if the sensors 104 are designed to obtain the value of only a specific metric on request, then the sensors 104 support a request to return a list of all available metrics. In another example, the output from the sensors 104 already contains all available metrics (e.g., storage system sensors may use system-level system commands and provide all discovered values in response). In this latter case the information can be "inferred" by the UI 101 from a sensor output.

In Block 202 the list of available metrics is obtained by the UI 101 and displayed to the user on, for example, a separate screen or window that contains a list of items whose values can be discovered.

The user is enabled to select an item from the list and to define a new attribute corresponding to the selected metric, or combination of metrics.

In Block 203 the user either selects an item from the list or defines a new item. If the latter is chosen, the user is prompted to either select a discoverable item from the list that would correspond to the one defined by the user, or to specify a formula that would allow the computation of the value of the new attribute using the predefined information. Alternatively, the user may indicate that an external class, an attribute bean 107, containing the attribute's properties and a getValue( ) method be provided during policy execution. If a user selects to specify a formula via the UI 101, the formula can be entered either by selecting the discoverable items and the predefined operators, or it can be entered as a string using the allowed operators. In the latter case, the string can be parsed later. The user may also enter additional information as listed in the "internal representation" below. If the user instead selects to use an attribute bean 107, the attribute name may be associated with an appropriate attribute bean by either using a naming convention, allowing specification of a class name via the UI 101, or by providing association in a separate file to the policy manager 102. In an alternative embodiment, a discovery component may be provided that locates the available attribute bean(s) 107 prior to their use in policies. The attribute bean(s) 107 can then be selected by the user during the policy specification step either via the UI 101 or by any other suitable method.

When the user saves the new policy attribute, the information is stored in the policy document or separately in Block 204. The information stored for each discoverable attribute may include the attribute internal name, the attribute "screen" name (if different from the internal name), measurement units, instructions for obtaining the attribute value from an existing metric or metrics (unless the internal name of an attribute directly corresponds to that of a metric provided by the sensors 104). In some cases, additional information may be stored as well, such as a range of allowed values that are to be checked at the time the policies are entered via the UI 101. For the attributes added via a separate object, the name of the class (if non-standard) can be provided as well.

The newly defined policy is then sent to the policy repository 103, via bus 109, in Block 205.

FIG. 2B shows the process of determining the value of a discoverable attribute(s) during policy evaluation.

When the policy engine (policy manager 102) evaluates a policy containing such an attribute, e.g., an attribute such as: 'if transfer-rate<5', it first determines at Block 210 if the attribute name directly corresponds to a metric discovered by sensors 104. If it does, the value is determined by the sensors 104 directly at Block 211. Otherwise, the attribute's definition is located at Block 212 to determine which metric(s) need to be obtained to determine the value of this attribute. The definition can be a specified formula, or the name of the corresponding attribute bean 107. If the required metric(s) is/are not available at Block 213, the policy is not evaluated (the Fail path from Block 213 is taken). If the attribute definition is found, the policy manager 102 (or an attribute bean 107) sends the request to the sensors 104 to obtain the required metrics at Block 214, and at Block 215 the sensors 104 get the required metrics values.

It should be noted that in some embodiments the sensors 104 can obtain all available values, and the policy manager 102 in this case needs to extract the required information. In other embodiments, different sensors 104 may be called with different parameters to determine all of the required information. This information is then made available to the policy manager 102. In some cases the user may provide information about how to call the sensors 104 to determine the value of a new item.

In any case, once all of the necessary values are obtained at Block 216, the policy manager 102 uses the provided formula or methods to calculate the value of the attribute at Block 217. If all of the required metrics are not available at Block 216, the policy execution process fails.

It should be noted that if the user does not provide the information on how to determine the value of the new attribute, it is not used in policies.

Figure 3B:
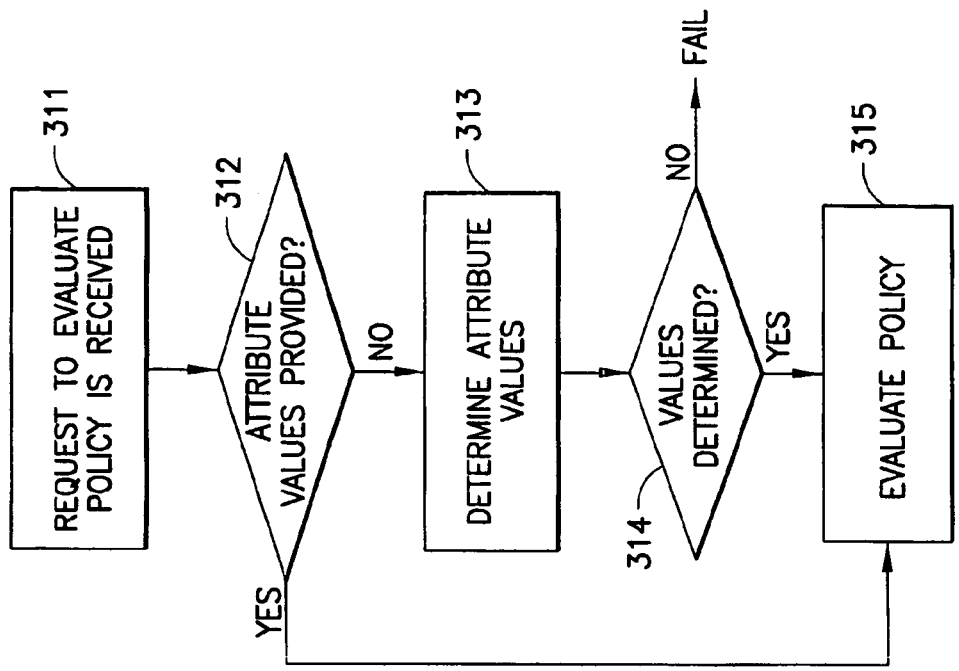
FIGS. 3A and 3B are logic flow diagrams that illustrate the introduction of non-discoverable attributes, where
Figure 3A:
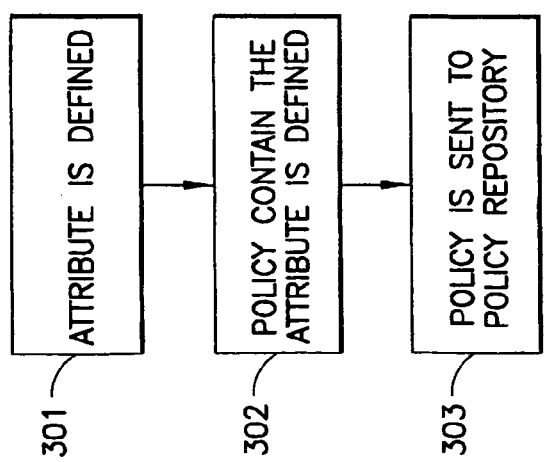

FIGS. 3A and 3B show a process for the introduction of non-discoverable attributes. At Block 301 new attributes are entered via the UI 101. For each new attribute the user may specify the attribute's name and, optionally, its relative priority for use during conflict resolution. The latter may be needed to resolve conflicts between policies of, by example, the type "if attribA='a' then class='gold'" and "if attribB='b' then class='silver'", when the values of both attributes are given in the query, e.g., "what is the class if attribA='a' and attribB='b'". If the internal name of an attribute is different from its "screen" name, both names are specified. In addition, in some cases it may be necessary to show an attribute's relationship to other attributes. For example, a customer A may only have specific servers available.

In Block 302 the new attributes are incorporated into the policies. The policies are then converted to an internal format and sent to the policy repository 103 at Block 303. Internally, the policies can be represented in several ways. In those cases where having a separate list of allowed attributes is desirable, it may be possible to represent the policies as a simple comparison between an attribute and a value (if "unit_location"=="auxiliary machine room"). The drawback of this approach is that it may impose a requirement on the policy manager 102 to read the list of the allowed attributes and to initialize all of them before evaluating the policies. Other, possibly improved, techniques could encode callbacks within the policies, for example: if currentValueOf("unit_location")=="auxiliary machine room".

In an alternate embodiment, or for some certain types of policies, there may be no requirements imposed on new attributes, and a user may be permitted to specify any desired attribute: if <something>==<something-else>. If this embodiment is implemented then the functionality represented by Blocks 301 and 302 may be combined, and the new attributes defined as part of the policy.

FIG. 3B shows the process of executing a policy. In Block 311, the request to evaluate a specific policy or group of policies is received. A non-limiting example of such a request is:

'determine service class for attributes: owner=chase, server=rack2bay7'.

If the values of the attributes contained in the policies are specified in the request at Block 312, as they are in the aforementioned example, the policies are directly evaluated at Block 315. If the values of all attributes are not available, an attempt is made at Block 313 to determine the values by using, for example, a callback method. The callback method can be specified either during the attribute definition, via the UI 101, or by using a separate association table/file to the policy manager 102. If the attribute values cannot be determined at Block 314, the request fails. Otherwise the policy is evaluated at Block 315.

What follows is a representative example, for the case of a policy-managed data storage system, of exemplary attributes, as well as the process that a user would go through with the UI 101 to define a new attribute based on exemplary types of sensors 104.

The user may define the average transfer rate (as described above) via the UI 101 as follows:

1. go to a "Define New Attribute" screen
2. type in the name of the new attribute, e.g.:
Attribute name: aveTransferRate
Screen name: average transfer rate
3. select read-transfer-rate and write-transfer-rate from a list of available metrics
4. depending on the implementation, type in or build by, for example, using a drag/drop technique, to create the formula:

$$(\text{read-transfer-rate} + \text{write-transfer-rate})/2.$$

The formula can be created from the selected metrics (read-transfer-rate and write-transfer-rate) and by selecting icons of common operators (e.g., +, /, −, etc.). Note that in some embodiments steps 3 and 4 can be done on one screen.

5. Activate a Save function.

The created attribute 'aveTransferRate' is then saved and its definition sent to the policy repository 103.

After the new attribute is saved, the user can use it in policies. For example, if the user goes to the "create new policy" screen, the new attribute is available under its "screen name", and can be used in a policy such as "if average transfer rate is >90 then reallocate storage". This policy is stored in the policy repository 103 with the 'average transfer rate' screen name represented as aveTransferRate. When this policy is evaluated, the policy manager 102 locates the aveTransferRate attribute's definition, determines the values of 'read-transfer-rate' and 'write-transfer-rate' from appropriate ones of the sensors 104, and computes the value of the aveTransferRate attribute.

The foregoing process is similar for static sensors 104. For example,. the user may choose to define a new attribute 'storagesystemld' that is created by the concatenation of model name and the serial number separated by a slash: <modelName>/<serial>. The user would follow the foregoing procedure to specify the attribute name, select the metrics, and then type or build the formula (in this case using the string concatenation operator).

Based on the foregoing description of the presently preferred embodiments it can be appreciated that this invention provides a method and a system for the dynamic addition of attributes to policies in a policy-based system. The new attributes can be defined by a user via the UI 101 or by the dynamic addition of code components to the policy engine or manager 102, with no need to change or modify the underlying base policy engine code.

This invention operates to divide all attributes into two main groups: (a) discoverable attributes whose values are determined as some function from the metrics obtained by the sensors 104 during system operation, or whose values can be determined from static properties of the system, and (b) non-discoverable attributes that do not correspond to any discoverable items, but instead are set during policy evaluation.

Discoverable attributes are preferably not introduced arbitrarily, but are associated with a property of the system determined by the sensors 104. Examples of discoverable attributes include the attribute 'throughput' that is used in the policy 'generate an alert if throughput is less than 90%, the attribute 'physical location' of a storage subsystem, whether the system supports encryption (and if it does, what type of encryption), and the attribute 'serial number'. When new discoverable attributes are introduced, they are either mapped directly to an available metric, or created ('derived attributes') by applying a user-defined function to one or more of the available metrics. The mapping can be done by the user via the UI 101 or, in case of more complicated functions, by an addition of a user-defined attribute-processing class to the policy manager 102. Such a class would be capable of, by example, taking as input certain discoverable attributes, and combining and transforming them in some way to produce a 'derived attribute'. In the former case, the user is able to obtain information on available metrics, select the metric(s) to be used in determining the derived attribute value, and to specify the formula to be used in determining the value of the derived attribute. In the latter case, the standard methods within the object (attribute bean 107) provide the method that obtains the attribute value during policy execution. To enable the discovery of the new class by the policy manager 102, the naming convention can associate the name of the class representing the attribute properties with the attribute name: e.g., "XXXAttributeBean" where XXX is the name of a new attribute.

Alternatively, the class name may be specified via the UI 101, or by using some predefined mapping instructions (possibly in the form of an xml mapping file). The class implements the method that allows determination of the attribute value based on the values returned by the sensors 104. Depending on how the metric values are determined, all at once or only upon request, the class may also provide a method to obtain the list of required metrics that can then be passed to the getvalue( ) method. The policy manager 102 may provide an interface or a base class (e.g., AttributeBean) that a user wishing to add a new attribute programmatically would be required to implement and/or extend.

It should be noted that passing metric values to getvalue( ) is but one suitable technique. Another technique uses a class setMetricValue(s) method(s) to set the values of the metrics, and then uses getvalue( ) to get the attribute's value.

In order to facilitate the introduction of discoverable attributes, they are preferably described using a standard model (e.g. the DMTF Common Information Model (CIM)) and a descriptive language (e.g. XML). The new attributes can be introduced into the policy using a mechanism similar to that described above.

A further example of a non-discoverable attribute is the identification of the requestor ('requestorId') in a policy "if the 'requestorId' is 'big_corporate_customer' the use service level='gold'". Such a policy is usually executed in response to a request such as "what is the service level for requestorId='a'". The value of such an attribute is set during policy execution from the request. The introduction of such an attribute into the system 10 via the user interface 101 is relatively straightforward, i.e., the user need only to enter this attribute via the UI 101 or, in case of an addition of the attribute as an AttributeBean, through a standard method that permits obtaining the value of an attribute. As the user can also create a non-discoverable attribute by combining a number of existing attributes, for example the ID and the Application ID taken together that when looked up in a network-wide database may identify a Transaction ID. In this case, the getValue( ) method preferably takes the list of attribute properties as a parameter.

Based on the foregoing description it can be appreciated that an aspect of this invention is a computer program that is embodied on a computer readable medium, such as disk, tape and/or semiconductor memory, that is executed by at least one data processor of the policy management system 10. The computer program includes first computer program instructions for implementing the UI 101 functions, and second computer program instructions for implementing the policy manager 102 functions that is coupled to the user interface via a policy repository for introducing a new attribute, using the first computer program instructions, into a policy for a policy-managed system, without requiring a change to (e.g., without having to re-write or re-compile) the second computer program instructions.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent metrics, metric sensors, attributes and techniques for specifying attributes may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method for execution in a policy management system, comprising:
    dynamically introducing a new attribute into a policy for the policy-managed system, without requiring a change to a policy manager, by executing steps that comprise
    operating at least one sensor coupled to the policy-managed system to dynamically discover a value of at least one existing metric;
    associating a new attribute with the discovered value of the at least one existing metric;

incorporating the new attribute into a policy; and storing the policy for future use, where operating further comprises determining if the new attribute is directly measurable by the at least one sensor, and if it is not, determining if a definition of the new attribute currently exists and if it does, determining from the new attribute definition the identity of at least one metric having a metric value required to determine a value of the new attribute, obtaining the metric value of the at least one required metric from a corresponding one of the sensors, and determining the value of the new attribute from the obtained at least one metric value, where the attribute definition comprises at least one of a formula specified by a user and a method that determines the value of the new attribute from existing information.

* * * * *